United States Patent
Gendre et al.

(10) Patent No.: US 10,406,741 B2
(45) Date of Patent: Sep. 10, 2019

(54) METHOD FOR MANUFACTURING CONTAINERS FROM PREFORMS, ALLOWING A SYSTEMATIC CHECK ON THE CONFORMITY OF THE PREFORMS

(71) Applicant: SIDEL PARTICIPATIONS, Octeville sur Mer (FR)

(72) Inventors: Julien Gendre, Octeville sur Mer (FR); Frederic Lethuillier, Octeville sur Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 374 days.

(21) Appl. No.: 15/110,313

(22) PCT Filed: Jan. 23, 2015

(86) PCT No.: PCT/FR2015/050169
§ 371 (c)(1),
(2) Date: Jul. 7, 2016

(87) PCT Pub. No.: WO2015/121558
PCT Pub. Date: Aug. 20, 2015

(65) Prior Publication Data
US 2016/0325485 A1 Nov. 10, 2016

(30) Foreign Application Priority Data
Feb. 12, 2014 (FR) .................. 14 51097

(51) Int. Cl.
*B29C 49/78* (2006.01)
*B29C 49/16* (2006.01)
(Continued)

(52) U.S. Cl.
CPC .............. *B29C 49/78* (2013.01); *B29C 49/16* (2013.01); *B29C 49/783* (2013.01);
(Continued)

(58) Field of Classification Search
CPC .......... B29C 2949/78025; B29C 2949/78042; B29C 2049/066; B29C 2049/068;
(Continued)

(56) References Cited

U.S. PATENT DOCUMENTS 7,556,137 B2 7/2009 Charpentier
2010/0201013 A1 8/2010 Monin et al.
(Continued)

FOREIGN PATENT DOCUMENTS

EP 1 777 056 A1 4/2007
EP 2 537 664 A1 12/2012
(Continued)

OTHER PUBLICATIONS

International Search Report, dated Apr. 30, 2015, from corresponding PCT Application.

*Primary Examiner* — Stella K Yi (57) ABSTRACT

Method of manufacturing containers by blow-molding preforms, comprising a phase of heating the preforms (3) followed by a phase of forming the containers (this phase comprising a pre-blowing step followed by a blowing step), this method comprising the operations consisting in: detecting a pressure spike during the pre-blowing and comparing it against a reference spike, if the pressure in the pressure spike is below the reference pressure, checking an event history to determine whether a heating instruction and/or a forming instruction has been modified; if the result of this check is positive, commanding at least one of the following actions: o generating an alert alarm, o stopping the supply of preforms to the oven, o ejecting the containers derived from the affected preforms.

11 Claims, 3 Drawing Sheets

(51) Int. Cl.
  *B29C 49/06*  (2006.01)
  *B29C 49/12*  (2006.01)
  *B29K 67/00*  (2006.01)
  *B29L 31/00*  (2006.01)

(52) U.S. Cl.
  CPC ............ *B29C 49/786* (2013.01); *B29C 49/06* (2013.01); *B29C 49/12* (2013.01); *B29C 2949/78025* (2013.01); *B29C 2949/78294* (2013.01); *B29K 2067/003* (2013.01); *B29L 2031/7158* (2013.01)

(58) Field of Classification Search
  CPC ....... B29C 49/16; B29C 49/36; B29C 49/783; B29C 49/28; B29C 2949/78806; B29C 2943/5084
  See application file for complete search history.

(56) References Cited

U.S. PATENT DOCUMENTS

| | | |
|---|---|---|
| 2011/0236518 A1 | 9/2011 | Cetinel et al. |
| 2012/0326345 A1 | 12/2012 | Gendre et al. |
| 2013/0081454 A1 | 4/2013 | Dieffenbacher et al. |
| 2015/0190959 A1 | 7/2015 | Deau et al. |

FOREIGN PATENT DOCUMENTS

| | | |
|---|---|---|
| EP | 2 574 902 A1 | 4/2013 |
| FR | 2 864 050 A1 | 6/2005 |
| FR | 2 909 305 A1 | 6/2008 |
| FR | 2 935 924 A1 | 3/2010 |
| WO | 2013/178903 A1 | 12/2013 |

METHOD FOR MANUFACTURING CONTAINERS FROM PREFORMS, ALLOWING A SYSTEMATIC CHECK ON THE CONFORMITY OF THE PREFORMS

BACKGROUND OF THE INVENTION

The invention relates to the manufacturing of containers by blow molding or stretch blow molding from preforms made of thermoplastic material such as PET (polyethylene terephthalate).

The manufacturing of the containers is conducted within a dedicated installation and comprises two main phases: heating and shaping. The preforms produced from molding (generally by injection, although there are techniques of molding by compression) are initially stored in bulk in a hopper of a supply system, from where they are extracted and then oriented (generally neck down) to be heated.

For the heating phase, the installation comprises a furnace equipped with infrared radiation sources (typically halogen lamps) by which the preforms from the hopper pass in a line. The heating phase is cyclic, with the preforms intended for a given container range being exposed to the same radiation for the same predetermined duration (commonly called heating time).

A complete heating cycle, which extends from the intake into the furnace of a cold preform, exiting the supply system, to the discharge from the furnace of the same hot preform, generally lasts less than one minute, typically about 20 seconds.

In theory, all of the preforms that have followed the same heating cycle have, at the outlet of the furnace, the same temperature, which depends essentially on the speed of advance of the preforms, the length of the furnace, the spectrum and the power radiated by the latter, as well as absorption properties of the material of the preforms.

In an ordinary furnace (halogen), the spectrum radiated by the sources is fixed. The same is true of the length of the furnace. The absorption properties of the material also cannot be controlled. By contrast, the speed of advance and the radiated power can vary based on instructions programmed into an electronic (or computer) control unit of the furnace.

If the theoretical temperature that the preforms are to have at the outlet of the furnace is referred to as "temperature instructions," these instructions in reality arise from the power radiated in the furnace, and therefore from the electrical power delivered to the sources, which can be programmed into the control unit. As a variant, it is possible to program temperature instructions directly, the control unit then being programmed to convert this temperature into power to be delivered to the sources. Below, the expression "temperature instructions" just as well refers to a theoretical temperature value programmed into the control unit or a power value to be delivered to the radiation sources.

For the shaping phase, the installation comprises a rotary-type shaping unit, provided with a carrousel and equipped, on the periphery of the carrousel, with a number of molds bearing the imprints of containers to be shaped.

At the outlet of the furnace, each preform that is still warm is inserted into a mold. A fluid (in general, air) is injected under pressure into the preform to shape the container. The shaping generally comprises two steps: a first so-called pre-blow-molding step during which the fluid is injected at a (relatively low) pressure and a pre-blow-molding flow rate that are predetermined, immediately followed by a blow-molding phase, during which the fluid is injected at a (comparatively higher) pressure and a blow-molding flow rate that are predetermined. Typically, for the production of containers intended to be filled with plain water, the pre-blow-molding pressure is on the order of 7 bars, and the blow-molding pressure is on the order of 25 bars.

The pressurized pre-blow-molding fluid is produced from a pressure source; it is delivered via a solenoid valve controlled by an electronic (or computer) control unit of the shaping unit. The pre-blow-molding pressure can be adjusted by means of a pressure regulator. The same is true of the flow rate, which can be adjusted by means of a flow rate restrictor. It is consequently understood that the pre-blow-molding pressure and the pre-blow-molding flow rate can be adjusted according to the respective instructions programmed into the control unit of the shaping unit, which directs the solenoid valve, the pressure regulator, and the flow rate restrictor based on the instructions.

The advances realized during the last decade in the fields of sensors and computer science have allowed manufacturers to outfit the installations to ensure a monitoring of certain critical parameters (in particular the heating temperature of the preforms and the pressure in the containers during shaping) and to carry out an analysis of these parameters to detect therein the characteristic derivatives of machine defects.

The measurement of temperature is illustrated in the French patent application FR 2 935 924 and in its U.S. equivalent US 2011/0236518. The measurement of pressure is illustrated in the French patent application FR 2 909 305 and in its U.S equivalent US 2010/201013.

In this latter application, it is recommended that a local pressure peak be detected during the pre-blow-molding phase, and, when this peak (reached at the time of development of the preform where the plastic flow threshold of the material is reached) does not coincide with a theoretical peak, that at least one machine parameter from among a set comprising in particular the heating temperature, the pre-blow-molding pressure, and the pre-blow-molding flow rate be modified. In other words, the installation is programmed to detect its own defects and to correct them if necessary, so as to limit the manufacturing defects in the containers.

This process operates wonderfully as long as the noted derivative of the local pressure peak is effectively due to a machine defect. In this case, the installation can, by a correction of its own parameters, bring the local pressure peak back into a tolerance zone in which it is accepted that the containers that are produced are true to the model.

In certain cases, however, it was noted that these corrective actions did not result in either eliminating the derivative of the local pressure peak or even controlling it. On the contrary, it happened that these corrective actions caused a worsening of the derivative of the peak, in contrast to the anticipated effect, to the point that it became necessary to stop production to reset the parameters of the machine.

Research has been conducted for identifying the causes of the derivative affecting the local pressure peak independently of the machine parameters. This research made it possible to determine that the local pressure peak can be assigned in a significant manner by a variation in the moisture level in the preforms.

To the knowledge of the inventors, such a relationship had never been demonstrated. It is certainly known that the mechanical properties of a plastic material (quite particularly the PET) can be affected by the moisture level of the material. However, as L. Vouyovitch van Schoors explains it in *Vieillissement hydrolytique des geotextiles polyester (polyéthylène téréphthalate)—État de l'art* [*Hydrolytic*

*Aging of Polyester Geotextiles (Polyethylene Terephthalate)—State of the Art]*, in Bulletin des Laboratoires des Ponts et Chaussées [Bulletin of the Laboratories of Bridges and Highways], No. 270-271, October/November/December 2007, "it is the chemical aging and more specifically the phenomena of hydrolysis that govern the durability of these materials ( . . . ). This type of aging is generally very slow at ambient temperature because of the low speed of the elementary chemical treatment and a slow diffusion of water within the polymer matrix."

In the case of shaping containers from preforms made of PET, it is not very likely that the variation in the local pressure peak during the pre-blow-molding phase can result in a phenomenon of hydrolysis of the material, because the average storage periods of the preforms (at ambient temperature) before their introduction into the manufacturing chain of the containers are much too short: several days, a month at the very most.

By contrast, it is plausible that a difference in moisture level of the material from one preform to the next becomes reality during the heating by a difference in their respective mechanical properties, inducing a different behavior of these preforms starting from the pre-blow-molding.

More specifically, it is evident from the tests conducted on preforms having various moisture levels that the strength of a container varies inversely to the moisture level of the perform from which it is produced. It is therefore important to ensure that the moisture level of the preforms does not exceed a determined threshold, beyond which the containers have an inadequate strength and should be scrapped.

In practice, however, the manufacturing rates (on the order of 50,000 containers per production line) do not make it possible to perform a systematic measuring of the moisture level of the preforms. At the very most, it is possible to take samplings and perform manual measurements on the sampled preforms. An ordinary technique for measuring the moisture level of a plastic consists in reducing a sample made of powder or granules (the measurement being consequently destructive), in carrying out a first weighing thereof, then in heating it under a dry atmosphere for a predetermined duration (on the order of several minutes), and in carrying out a second weighing thereof, with the difference in weight making it possible to determine the evaporated water weight. A program makes it possible to deduce therefrom the total water weight initially present in the sample, in relation to the total weight of the latter.

This technique, illustrated by the European patent application EP 2 574 902 or its U.S. equivalent US 2013/081454, requires an at least partial destruction of the sample and an extension of treatment of several minutes. For each of these two reasons, such a technique cannot be applied to the continuous check of the moisture level of the preforms in a container production line. First of all, the integrity of each preform is to be preserved, unless it is imagined to design a new type of preform provided with a detachable part intended for the check, which assumes a substantial modification of the manufacturing technique as well as an increased consumption of material. Next, a manufacturing rate of 50,000 containers per hour means that a preform is introduced into the production line (respectively, a container is evacuated from the production line) approximately every 70 milliseconds. Only an optical measurement would keep up such a pace. Tests, however, have demonstrated that a variation in the moisture level does not have a measurable effect either at the inlet of the furnace (no measurable variation in the transparency of the material at the same temperature) nor at the outlet (no measurable variation in the heat distribution in the preform under the same heating conditions).

SUMMARY OF THE INVENTION

The inventors consequently had the idea of using the pressure variations with the local pressure peak during pre-blow molding for deducing from it information on the moisture level of the preforms.

The implementation of this idea is difficult, however, because it involves allowing the machine, which carries out the measurements in an automated manner for detecting in particular a derivative of the pressure peak, to distinguish between a defect affecting the machine (correctable by action on the machine parameters) and a non-conformity of the preforms (not correctable and requiring other actions).

A first objective is consequently to propose a process for manufacturing containers from preforms, making it possible to perform a continuous check of the conformity of the preforms with regard to their moisture level.

A second objective is to make possible a reliable check of the conformity of the preforms.

A third objective is to make it possible to distinguish between internal derivative causes in the machine and defects affecting the preforms.

For this purpose, in the first place, a process for manufacturing containers by blow molding from preforms made of thermoplastic material is proposed, which process comprises a cyclic phase for heating preforms in a stream within a furnace, at a heating temperature and a speed of advance according to programmed heating instructions, followed by a cyclic phase for shaping preforms within a shaping unit comprising a number of molding stations, each equipped with a mold bearing the imprint of a container, the shaping phase comprising a pre-blow-molding step consisting in injecting into the preforms a gas at a pressure and a pre-blow-molding flow rate according to programmed shaping instructions, followed by a blow-molding step that consists in injecting into the preforms a gas at a blow-molding pressure that exceeds the pre-blow-molding pressure, with this process also comprising the repetition of the operations consisting in:

Measuring, at every instant, a real value of the pressure prevailing in the preforms within each mold, at least during the pre-blow-molding step;

Storing the real pressure values thus measured and the associated measurement times;

Detecting among these real pressure values a maximum real value;

Comparing this maximum real value and the associated measurement time with, respectively, a predetermined maximum reference value and an associated reference time;

Verifying whether the following necessary conditions are fulfilled together over a period that is greater than or equal to the length of a heating cycle and for all of the molding stations:

The measurement time associated with the maximum real value coincides with the reference time, The maximum real value is less than the maximum reference value, If these conditions are fulfilled together, verifying in a chronology of events whether the heating instructions and/or the shaping instructions have undergone any modifications during a predetermined time interval preceding the measurement, If the result of this verification is positive, declaring the preforms in question to be sub-standard;
Ordering at least one of the following actions:
Generating an alert,
Stopping the supply of the furnace with preforms,
Ejecting the containers produced from sub-standard preforms.

According to various particular characteristics, taken by themselves or in combination:
The measurement time associated with the maximum real value is declared to coincide with the reference time if the difference between them is less than or equal to approximately 10 ms, and more particularly less than or equal to approximately 5 ms;
The maximum real pressure value is less than the maximum reference value if the deviation between these values is greater than several hundred millibars;
The generation of an alert consists in displaying a message on a graphic interface;
The furnace and the heating unit are respectively directed by dedicated slave control units, attached to the same master control unit that carries out the verification operations.

According to a second aspect, the invention relates to an installation for manufacturing containers by blow molding from preforms made of thermoplastic material, with this installation comprising:
A furnace in which the preforms undergo a cyclic heating phase at a heating temperature and a speed of advance according to heating instructions;
A system for supplying the furnace with preforms;
A shaping unit comprising a number of molding stations, each equipped with a mold bearing the imprint of a container, for the shaping of containers by blow molding or stretch blow molding of the preforms exiting the furnace, following a cyclic shaping phase comprising a pre-blow-molding step consisting in injecting into the preforms a gas at a pre-blow-molding pressure and a pre-blow-molding flow rate according to shaping instructions, followed by a blow-molding step consisting in injecting into the preforms a gas at a blow-molding pressure that exceeds the pre-blow-molding pressure;
A command system including at least one memory in which the heating instructions and the shaping instructions are stored, with this system being programmed for:
Measuring, at every instant, a real value of the pressure prevailing in the preforms within each mold, at least during the pre-blow-molding step;
Storing the real pressure values thus measured and the associated measurement times;
Detecting among these real pressure values a maximum real value;
Comparing this maximum real value and the associated measurement time with, respectively, a predetermined maximum reference value and an associated reference time;
With the command system being programmed for:
Verifying if the following necessary conditions are fulfilled together over a period that is greater than or equal to the length of a heating cycle and for all of the molding stations:
The measurement time associated with the maximum real value coincides with the reference time,
The maximum real value is less than the maximum reference value, If these conditions are fulfilled together, verifying in a chronology of events whether the heating instructions and/or the shaping instructions have undergone any modifications during a predetermined time interval preceding the measurement;
If the result of this verification is positive, declaring the preforms in question to be sub-standard;
Ordering at least one of the following actions:
Generating an alert,
Stopping the supply of the furnace with preforms,
Ejecting the containers produced from sub-standard preforms.

According to a third aspect, the invention relates to a computer program implemented on a computer processing unit integrated with a command system of a container manufacturing installation, with this program comprising instructions for implementing steps of a container manufacturing process as was just presented.

BRIEF DESCRIPTION OF THE DRAWINGS

Other objects and advantages of the invention will become evident from the description of an embodiment, given below with reference to the accompanying drawings in which.

DETAILED DESCRIPTION OF THE PREFERRED EMBODIMENTS

Figure 1:
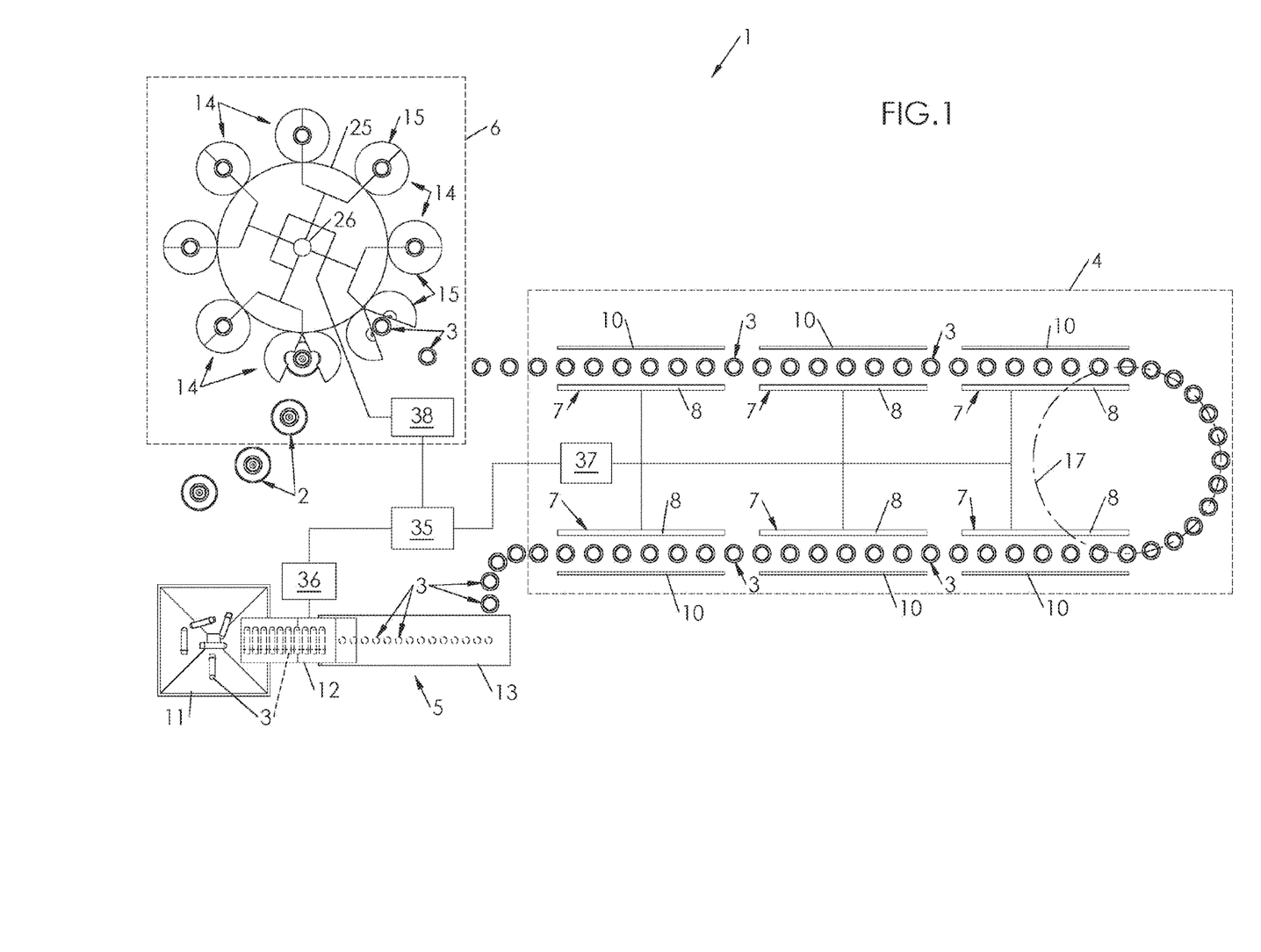
FIG. 1 is a diagrammatic view showing a container manufacturing installation, comprising a furnace and a blow-molding machine.
Figure 2:
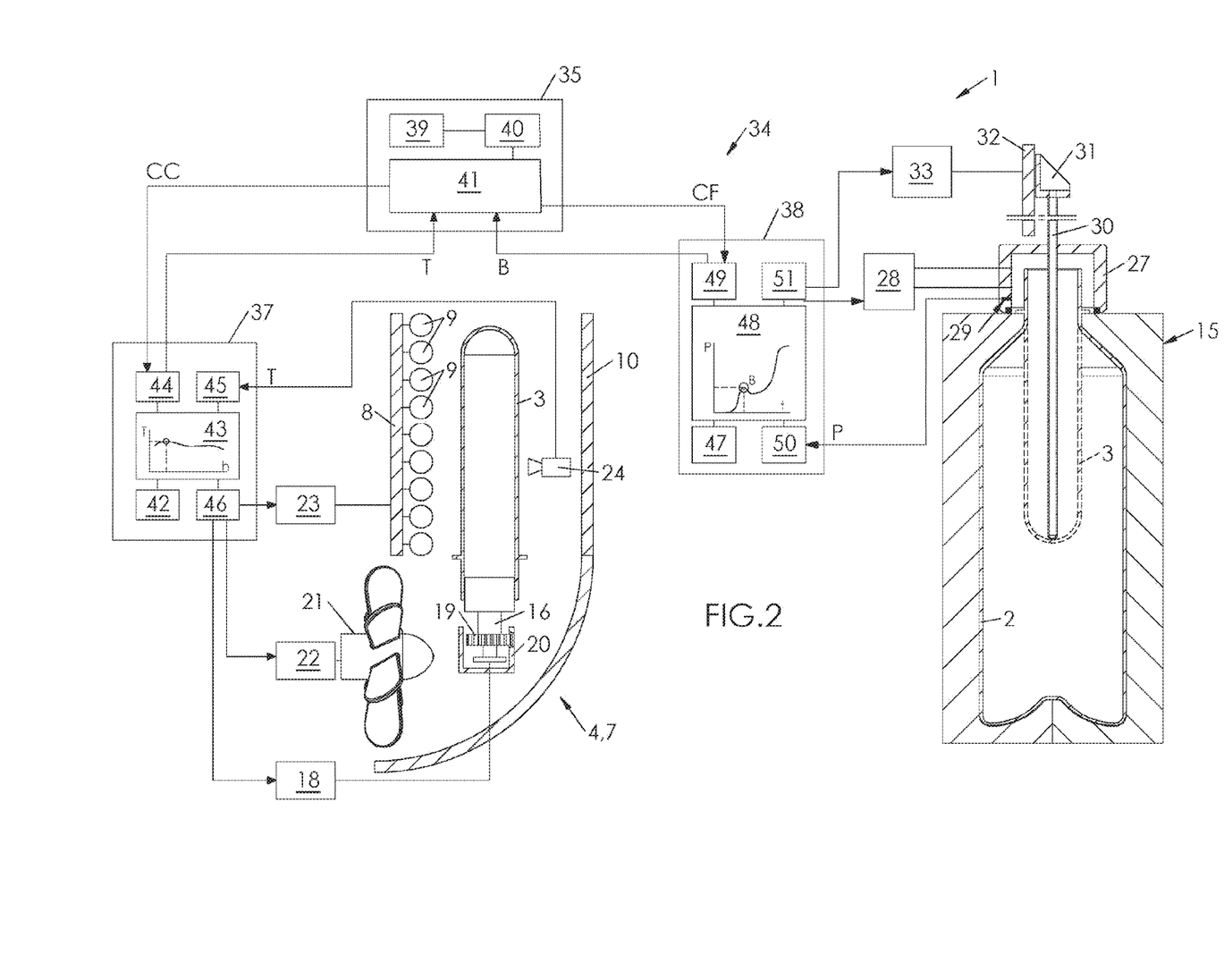
FIG. 2 is a diagrammatic view illustrating in more detail the structure of the device that makes it possible to perform the measurement of pressure within preforms.

Shown diagrammatically in FIGS. 1 and 2 is an installation 1 for manufacturing containers 2 from preforms 3 made of thermoplastic material, in particular PET (polyethylene terephthalate).

The installation 1 comprises three successive handling units connected to one another, namely a heating unit 4 or furnace, a system 5 for supplying the furnace with preforms 3, and a unit 6 for shaping containers 2 by blow molding or stretch blow molding preforms 3 exiting the furnace 4.

The furnace 4 comprises a series of heating modules 7, each having a radiating wall 8 provided with superposed sources 9 of infrared radiation and preferably (as illustrated) a reflecting wall 10 placed facing the radiating wall 8 for reflecting the portion of radiation not absorbed by the preforms 3.

The supply system 5 comprises:
A hopper 11, in which the preforms 3 are stored in bulk by being discharged therein uniformly in lots (either manually or in an automated manner, from rolling stocks),
A lift 12 that continuously removes preforms 3 from the hopper 11,
A tunnel 13 for alignment and disentangling, into which the preforms 3 removed by the lift are discharged.

Such a supply system 5 is well known, in particular from the French patent FR 2 864 050 or its U.S. equivalent U.S. Pat. No. 7,556,137, and will therefore not be described in more detail.

The shaping unit 6 is equipped with a series of shaping stations 14, each provided with a mold 15 bearing the imprint of a container 2.

In FIG. 1, the installation 1 is shown in a very diagrammatic manner. In particular, this drawing is not to scale, for the sake of clarity and compactness. It thus is seen that in an artificial manner, the supply system 5 is undersized in relation to the furnace 4, which indicates the smaller size of the preforms 3.

In a conventional manner, the preforms 3 at ambient temperature coming from the supply system 5 are, optionally after returning to be oriented neck down, inserted into the furnace 4 via an inlet of the latter. The preforms 3 are then heated in a stream in the furnace 4 at a temperature that is higher than the glass transition temperature of the material (approximately 80° C. for PET). The heating temperature of the preforms 3 made of PET is typically approximately 120° C.

According to a particular embodiment illustrated in FIGS. 1 and 2, the preforms 3 are, in the furnace 4, mounted on pivoting supports 16 referred to as spinners. Each spinner 16 is mounted on a chain that circulates on a drive wheel 17 driven in rotation by a motor 18. Each spinner 16 is provided with a pinion 19 that engages a rack 20 for driving the spinner 16 in rotation during its travel into the furnace 4 and thus for exposing the surface of each preform 3 to the radiation coming from the sources 9.

To evacuate at least a portion of the excess heat produced by the radiating wall 8, the furnace 4 can be equipped with an extraction system comprising, for example, a fan 21 driven by a motor 22 and positioned at right angles to the necks of the preforms 3.

In addition, the power of the radiation emitted by the radiating wall 8 can be modulated by means of a power variable-speed drive unit 23, as in the embodiment illustrated in FIG. 2.

The thermal profile of the preforms 3 is preferably controlled, either directly in the furnace 4, or at the outlet of the latter, by means of a heat sensor 24. According to an embodiment illustrated in FIG. 2, the heat sensor 24 is a thermal camera pointing toward the preforms 3.

At the outlet of the furnace 4, the thus heated preforms 3 are transferred (optionally by being returned to be oriented neck up) toward the shaping unit 6 via a transfer unit (such as a transfer wheel) each to be shaped into a container by blow molding or stretch blow molding in an individual mold 15.

At the end of the shaping, the containers 2 are evacuated from the molds 15 for the purpose of being filled and labeled immediately, or stored temporarily for the purpose of being filled and labeled subsequently. Once filled and labeled, the containers 2 are grouped and packaged, for example, within a plastic-wrapping unit that envelops each group of containers in a heat-shrinkable film.

As is also seen in FIG. 1, the shaping unit 6 comprises a pivoting carrousel 25, commonly called a wheel, at the periphery of which are mounted the shaping stations 14 and a sensor 26 of the instantaneous angular position of the wheel 25, in the form of, for example, a coder (i.e., in practice, an instrument-equipped bearing device).

Each shaping station 14 is equipped with a nozzle 27, by which a fluid (in particular a gas such as air) is injected into the mold 15. Each shaping station 14 is also equipped with an injection device comprising an actuator block 28 connected to the nozzle 27 for controlling the injection of the fluid.

The actuator block 28 comprises, for example, solenoid valves, by means of which the nozzle 27 is brought into communication with pressurized fluid sources, at least one pressure variable-speed drive unit for adjusting the pressure of the fluid according to predetermined pressure instructions, and at least one flow rate restrictor for adjusting the fluid flow rate according to predetermined flow rate instructions.

In addition, each shaping station 14 is provided with a device 29 for measuring the pressure (denoted P) prevailing in the preform 3—i.e., in the container 2 during shaping. In the illustrated example, the measuring device 29 comprises a pressure sensor mounted in the area of the nozzle 27, in which the pressure is, during shaping, identical to the pressure prevailing in the latter.

According to an embodiment corresponding to a process for shaping by stretch blow molding, each shaping station 14 also comprises a movable stretching rod 30, integral with a carriage 31 mounted in translation in relation to a support 32.

The movement of the rod 30 is controlled in an electromagnetic manner. For this purpose, the support 32 comprises an electromagnetic track connected to a motor 33, and the carriage 31 is itself magnetic. The sign and the power of the current passing through the track make it possible to move the rod 30 along a predetermined movement profile, comprising a direction and a speed of motion, also referred to as a stretching rate.

The installation 1 is equipped with a command system 34 that comprises a master control unit 35 of the installation 1 and multiple slave control units 36, 37, 38 (in this case, three in number) slaved to the master control unit 35 and respectively directing the supply system 5, the furnace 4, and the shaping unit 6.

The master control unit 35 is computerized and comprises:

A memory 39 into which programs for directing the furnace 4, the supply system 5, and the shaping unit 6 are written, A processor 40 connected to the memory 39 for applying the instructions of the programs, and A communication interface 41 connected to the processor 40 for communication with the slave control units 36, 37, 38.

The control unit 37 of the furnace 4 comprises:

A memory 42 into which programs for directing heating modules 7 are written,

A processor 43 connected to the memory 42 for applying the instructions of the program, A communication interface 44 connected to the processor 43 for communication with the master control unit 35 via the interface 41 for communication with the latter, An input interface 45 connected, on the one hand, to the processor 43, and, on the other hand, to the heat sensor 24, An output interface 46 connected, on the one hand, to the processor 43 and, on the other hand, to the power variable-speed drive unit 23 and to the motors 18, 22 of the drive wheel 17 and the fan 22.

The control unit 37 of the furnace 4 is programmed to carry out in particular the following operations:

Directing the or each heating module 7 with which it is associated, according to heating instructions CC that are programmed (i.e., written) into the memory 42;

Based on the measurement of temperature (denoted T) obtained from the heat sensor 20, plotting the instantaneous thermal profile of each preform 3, which can come in the form of an average temperature measured for the entire preform 3, a set of multiple temperature values at different heights on the body of the preforms 3, or a curve providing the temperature T based on the height (denoted h) on the preform 3;

Communicating the thus plotted thermal profile to the master control unit 35.

The heating instructions CC are part of the directing program of the furnace 4; in this connection, they are initially programmed into the memory 39 of the master control unit 35, which communicates them to the control unit 37 of the furnace 4. The instructions CC comprise at least one, and preferably all, of the following parameters:

A reference temperature value or a reference temperature profile, or else a reference power value or a reference power profile delivered by the variable-speed drive unit 23, A reference speed of rotation of the motor 22 of the fan 21, A speed of rotation of the drive wheel 17 (and therefore, consequently, a speed of advance of the preforms 3—in other words, the production rate of the furnace 4).

The heating instructions CC are able to undergo variations, for example, at the initiative of an operator. In this case, the latter can make the correction that he believes necessary by a reprogramming of the master control unit 35. The corrected instructions CC are then relayed to the control unit 37 of the furnace 4 and written by the processor 43 in the memory 42.

The variations of the heating instructions CC are written in a chronology that is kept up to date in the memory 39 of the master control unit 35.

Conversely, the control unit 35 uses thermal profiles of the preforms and can be programmed to perform an analysis of them for the purpose of detecting variations therein in relation to a reference thermal profile. These variations can be written in the chronology.

The slave control unit 38 associated with the shaping unit 6 comprises:

A memory 47 into which programs for directing shaping stations 14 are written, A processor 48 connected to the memory 47 for applying the instructions of the program, A communication interface 49 connected to the processor 48 for the communication with the master control unit 35, An input interface 50 connected, on the one hand, to the processor 48 and, on the other hand, to the device 29 for measuring pressure, denoted P, prevailing in the mold 15, An output interface 51 connected, on the one hand, to the processor 48 and, on the other hand, to the block 28 of actuators, and, if necessary, to the control motor 33 of the stretching rod 30.

As a variant, the input and output interfaces 50, 51 can be reassembled within a single input/output interface.

The shaping is cyclic, i.e., each preform 3 successively undergoes the same sequence of operations. The shaping comprises two steps: a first pre-blow-molding step, during which the fluid is injected into the preform 3 at a relatively low pre-blow-molding pressure (typically on the order of 7 bars), at a certain pre-blow-molding flow rate, followed by a blow-molding step during which the fluid is injected into the preform 3 at a comparatively higher blow-molding pressure (typically on the order of 25 bars), at a certain blow-molding flow rate. The general trend in the variations in pressure in the preform 3 during shaping is known, cf. for example, the pressure curve of FIG. 3 of the French patent application FR 2 909 305 or its U.S. equivalent US 2010/201013.

The control unit 37 of the shaping unit 6 is programmed to carry out in particular the following operations:

Directing each shaping station 14 for the fulfillment of a complete shaping cycle, from the loading of a preform 3 to the unloading of the shaped container 2, according to programmed shaping instructions CF (i.e., written) in the memory 47;

Ordering a measurement, at every instant, of a real value of the pressure prevailing in the preforms within each mold 15. The pressure measurement is carried out continuously by the pressure sensor 29 continuously or in a sequential and regular manner, at predetermined intervals (for example, 5 ms) and communicated to the processor 48 via the input interface 50;

Storing the real pressure values thus measured and the associated measurement times, Based on these measurements, plotting during the shaping cycle a blow-molding curve describing the change in the fluid pressure P in the mold 15 at every instant, denoted t (in practice, at times measured by the internal clock of the processor 48, corresponding to the angular positions provided by the angular sensor 26), this curve (diagrammatically visible in FIG. 2) being plotted by the processor 48 and stored during the cycle.

The shaping instructions CF are part of the program for directing the shaping unit 6; in this regard, it is initially programmed in the memory 39 of the master control unit 35, which communicates it to the control unit 38 of the shaping unit 6. The instructions CF comprise at least one, and preferably all, of the following parameters:

The pre-blow-molding pressure to be delivered by the block 28 of actuators,

The pre-blow-molding flow rate to be delivered by the block 28 of actuators, The blow-molding pressure to be delivered by the block 28 of actuators, The blow-molding flow rate to be delivered by the block 28 of actuators, The stretching rate of the rod 30.

The shaping instructions CF are able to undergo variations, for example at the initiative of an operator. In this case, the latter can make the correction that he believes necessary by a reprogramming of the master control unit 35. The corrected instructions CF are then relayed to the control unit 38 of the shaping unit 6 and written by the processor 48 in the memory 47.

The variations of the shaping instructions CF are written in the chronology that is kept up to date in the memory 39 of the master control unit 35.

The instructions CF are applied by the processor 48, which consequently directs the block 28 of actuators via the output interface 51; the stretching rate can be converted by the processor 48 of the controller 38 into power to be delivered by the motor 33.

The control unit 38 of the shaping unit 6 is also programmed for carrying out the following operations:

Analyzing the blow-molding curve and extracting from it the coordinates (real value, associated measurement time) of a local pressure peak during the pre-blow-molding step, referred to as point B, as defined in the application FR 2 909 305 (or in its U.S. equivalent US 2010/201013);

Communicating from the end of the cycle the coordinates of point B to the master control unit 35.

The processor 40 of the master control unit 35 is then programmed for:

Taking into account the real points B communicated by the control unit 38 of the shaping unit 6 over a period that is greater than or equal to the length of a heating cycle and for all of the shaping stations 14, Comparing each real point B with a reference point (defined by a value of pressure, called reference pressure, and an associated time, called reference time) written in advance in the memory 39 of the master control unit 35 and corresponding to a model container.

More specifically, the processor 40 is programmed to compare the pressure and the time of each point B with, respectively, the pressure and the reference time.

The objective is to detect a variation in the moisture level in the preforms 3 from the drift of point B. The processor 40 is consequently programmed to act only if the following conditions, so-called necessary conditions, are fulfilled together over a period that is greater than or equal to the length of a heating cycle and for all of the shaping stations 14:

The time of the real point B coincides (with a predetermined tolerance, typically on the order of several milliseconds) with the reference time;

The pressure at the real point B is less than the maximum reference value.

Experience shows that actually two preforms 3 having different moisture levels have, under the same heating and shaping conditions, pressure peaks during the pre-blow molding (points B) that differ only by the value of the pressure (on the ordinate in FIG. 3), with the associated times being combined. In other words, a variation in the moisture level in the preform does not mean that there is a temporal offset of point B.

Figure 3:
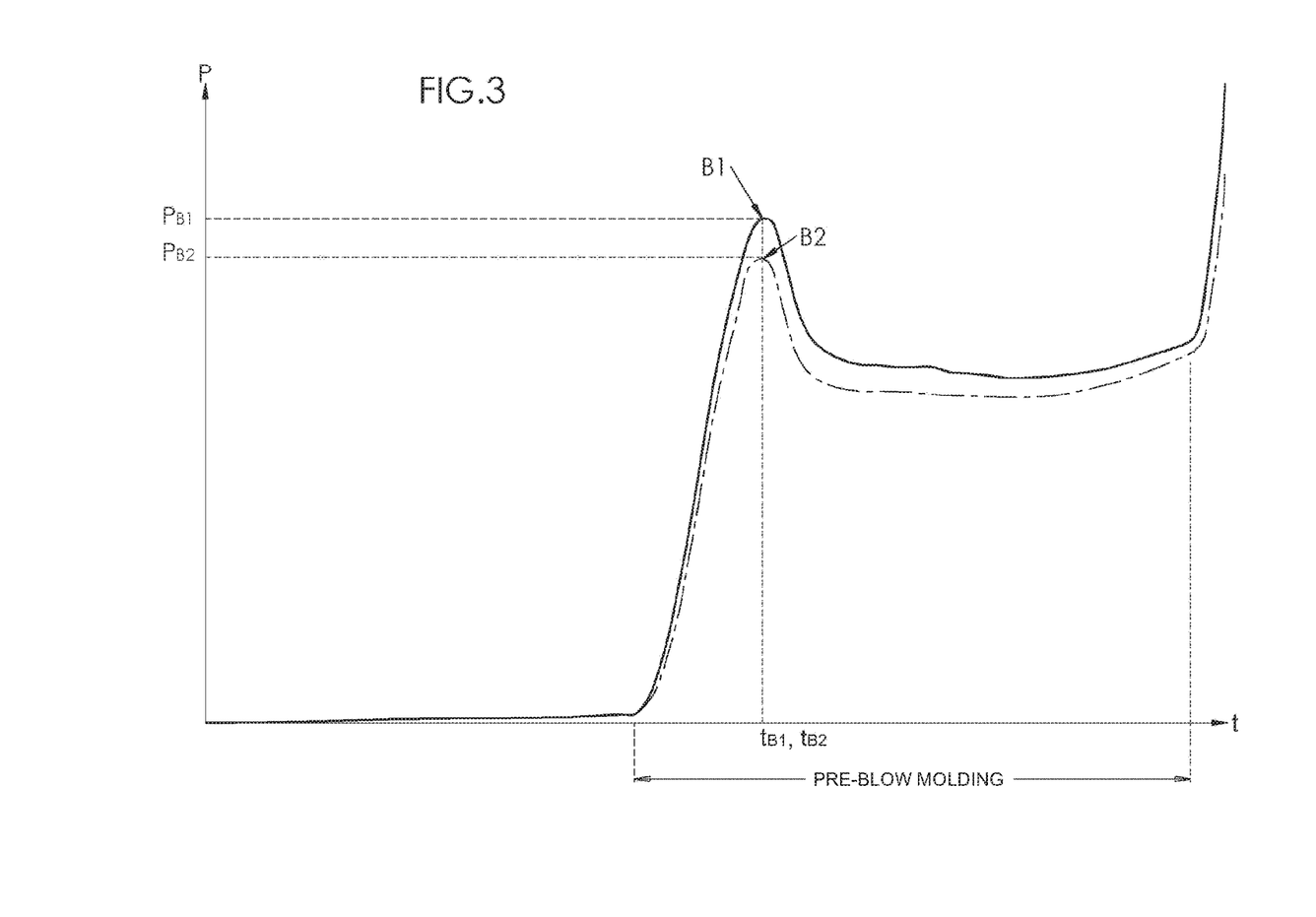
FIG. 3 is a diagram in which are plotted two curves illustrating variations of the pressure based on the time during the pre-blow-molding phase, for two preforms having different moisture levels.

Consequently, a temporal drift of point B is analyzed as having other causes than a variation in the moisture level in the preforms.

In addition, the inventors observed that the pressure at the point B varies inversely to the moisture level in the preform. Thus, when the pressure at the point B is greater than the reference pressure, this means that the moisture level of the preform from which the container is produced is less than that of the model container and consequently does not justify any particular action.

By contrast, the fact that the above-mentioned necessary conditions are fulfilled is a sign that an at least temporary variation in the moisture level affects the preforms. The fact that these conditions are fulfilled over a period that is greater than or equal to the length of a heating cycle and for all of the shaping stations shows that such a defect, if it transpires, affects all of the preforms, from which it is possible to deduce that a complete lot is possibly affected by a variation in the moisture level.

These conditions are not sufficient, however, to justify the above-mentioned conclusions. Actually, a defect affecting at least one of the machine parameters (heating temperature or heating profile, speed of advance, pre-blow-molding pressure, pre-blow-molding flow rate, and optionally stretching rate) can be at the origin of a variation in point B.

This is why the central control unit 35 is programmed for carrying out a verification that none of these parameters has undergone for modification of instructions CC or CF during a predetermined time interval that has preceded the measuring sequence of the points B having a drift that is greater than or equal to the length of the heating cycle. Actually, any modification of the instructions CC or CF induces a modification of the operating conditions to which the preforms are subjected. In particular, any modification of the heating profile or heating temperature requires a stabilization of the furnace 4, the preforms 3 that are present in the latter during the modification having properties that are not stabilized due to the thermal inertia of the furnace 4.

The control unit 35 is programmed to act only if the result of this verification is positive (i.e., none of these parameters has undergone a variation).

In this case, it has turned out that a defect of the moisture level (too high) is the cause of the drift of point B, since the causes internal to the installation (variation in the heating temperature, of the speed of advance, of the pre-blow-molding pressure or the pre-blow-molding flow rate) have been eliminated. The preforms in question are then declared to be sub-standard.

This situation is illustrated in FIG. 3, which shows a graph on which are plotted the blow-molding curves (centered on the pre-blow-molding step) of two preforms that are distinguished from one another by their moisture levels. The first preform, which has a moisture level corresponding to the reference level of a model container, and whose blow-molding curve is plotted in bold lines, exhibits, during the pre-blow molding, a pressure peak at a point B1, whose pressure value is denoted $P_{B1}$ (corresponding to the reference pressure stored in the memory 39) and whose corresponding measurement time is denoted $t_{B1}$ (corresponding to the reference time stored in the memory 39). The second preform, which has a moisture level that is essentially greater than the reference level of the model container and whose blow-molding curve is plotted in broken lines, has during pre-blow molding a pressure peak of a point B2, whose pressure value is denoted $P_{B2}$ and whose corresponding measurement time is denoted $t_{B2}$. It is noted that the two points B1 and B2 have simultaneous measurement times:

$$t_{B1} \approx t_{B2}$$

In practice, the master control unit 35 is programmed to declare simultaneous any time $t_{B2}$ for measuring a pressure peak with the reference time $t_{B1}$ as soon as the difference between these times $t_{B1}$ and $t_{B2}$ is less than or equal to several milliseconds (at the very most about ten milliseconds, preferably less than approximately 5 milliseconds).

By contrast, it is noted that the real pressure $P_{B2}$ at the point B2 is essentially less than the reference pressure $P_{B1}$ at the point B1:

$$P_{B2} < P_{B1}$$

In practice, the master control unit 35 is programmed to declare any real pressure $P_{B2}$ to be different from the reference pressure $P_{B1}$ as soon as the difference between these values is greater than or equal to several tens, and even several hundreds, of millibars.

The control unit 35 is programmed then to control at least one of the following actions:

Generating an alert, which can be displayed on a control screen, directed at the operator responsible for monitoring the installation; this alert comprises, for example, a message inviting the operator to check the moisture level of the preforms, to replace the preforms 3 of the hopper by another lot, or else to perform checks on the containers 2 produced;

Stopping the supply of the furnace 4 with preforms, for example by ordering the shutdown of the lift 12 of the supply system 5;

Ejecting the containers 2 produced from sub-standard preforms 3; this operation can be carried out thanks to the traceability of the containers 2 produced by the angular position information of the shaping stations 14, coming from the angular sensor 26. The container 2 coming from a preform declared to be sub-standard can then be ejected upon its discharge from the mold 15.

The process that was just described offers several advantages.

First, it makes it possible to distinguish, when a drift is noted at the point B (showing a poor quality of the containers produced), between causes for the internal drift in the machine and defects affecting the preforms themselves. This makes it possible to prevent a worsening of the drift at the point B by improper correction of the heating or shaping instructions.

Second, this process makes it possible to initiate a continuous check of the conformity of the preforms with regard to their moisture level, thanks to the detection of the point B and the verification of its similarity with a reference point corresponding to a model container.

Thanks to the verification carried out on the heating and/or shaping instructions, this conformity check is reliable.

The invention claimed is:

1. A process for manufacturing containers (2) by blow molding from preforms (3) made of thermoplastic material, comprising:
   a cyclic phase for heating preforms (3) in a stream within a furnace (4), at a heating temperature and a speed of advance according to programmed heating instructions (CC), followed by a shaping phase for shaping preforms (3) within a shaping unit (6) with a plurality of molding stations (14), each of said molding stations equipped with a mold (15) bearing an imprint of a container (2),
   the shaping phase being cyclic and comprising a pre-blow-molding step that includes injecting into the preforms (3) a gas at a pre-blow-molding pressure (P) and a pre-blow-molding flow rate according to programmed shaping instructions (CF), followed by a blow-molding step that includes injecting into the preforms (3) a gas at a blow-molding pressure that exceeds the pre-blow-molding pressure,
   the process also comprising operations of:
      measuring, at every instant, a real value of the pressure prevailing in the preforms (3) within each mold (15), at least during the pre-blow-molding step;
      storing the real pressure values thus measured and associated measurement times;
      detecting among said real pressure values a maximum real value of the pressure;
      comparing said maximum real value of the pressure and the associated measurement time with, respectively, a predetermined maximum reference value of the pressure ($P_{B1}$) and an associated reference time ($t_{B1}$);
      verifying whether the following necessary conditions are fulfilled together over a period that is greater than or equal to a length of time of a heating cycle and for all of the molding stations (14):
         the measurement time associated with the maximum real value of the pressure coincides with the reference time ($t_{B1}$), and
         the maximum real value of the pressure is less than the maximum reference value of the pressure ($P_{B1}$),
      where the maximum real value of the pressure is determined to be less than the maximum reference value of the pressure ($P_{B1}$) if the difference between the maximum real value of the pressure and the maximum reference value of the pressure ($P_{B1}$) is greater than several hundred millibars;
      in the event said necessary conditions are fulfilled together, verifying in a chronology of events whether the heating instructions (CC) and the shaping instructions (CF) have undergone any modifications during a predetermined time interval preceding said measuring; and
      in the event the result of said verifying indicates that neither of the heating instructions (CC) nor the shaping instructions (CF) has undergone a modification during said predetermined time interval, determining the preforms (3) to be sub-standard and carrying out at least one of the following actions:
         generating an alert,
         stopping the supply of the furnace (4) with preforms (3), and
         ejecting the containers (2) produced from sub-standard preforms (3).

2. The process according to claim 1, wherein the measurement time associated with the maximum real value is determined to be simultaneous with the reference time if the difference between them is less than or equal to approximately 10 ms.

3. The process according to claim 2, wherein the measurement time associated with the maximum real value is determined to be simultaneous with the reference time if the difference between them is less than or equal to approximately 5 ms.

4. The process according to claim 1, wherein the generation of an alert includes displaying a message on a graphic interface.

5. The process according to claim 1, wherein with the furnace (4) and the heating unit (6) being directed respectively by dedicated slave control units (37, 38), both attached to a master control unit (35), the verification operations are carried out by the master control unit (35).

6. An installation (1) for manufacturing containers (2) by blow molding from preforms (3) made of thermoplastic material, comprising:
   a furnace (4) in which the preforms (3) undergo a cyclic heating phase at a heating temperature and a speed of advance according to heating instructions (CC);
   a system (5) for supplying the furnace (4) with preforms (3);
   a shaping unit (6) comprising a number of molding stations (14), each of said molding stations equipped with a mold (15) bearing an imprint of a container (2), for the shaping of containers (2) by blow molding or stretch blow molding of the preforms (3) exiting the furnace (4), following a cyclic shaping phase comprising a pre-blow-molding step that includes injecting into the preforms (3) a gas at a pre-blow-molding pressure (P) and a pre-blow-molding flow rate according to shaping instructions (CF), followed by a blow-molding step consisting in injecting into the preforms (3) a gas at a blow-molding pressure that exceeds the pre-blow-molding pressure;
   a command system (34) including at least one memory (39) in which a chronology of events is stored, said chronology of events including at least the heating instructions (CC) and the shaping instructions (CF), together with a time from which either of a new heating instruction or a new shaping instruction is made active, with said system (34) being programmed for:

measuring, at every instant, a real value of the pressure prevailing in the preforms (3) within each mold (15), at least during the pre-blow-molding step, storing the real pressure values thus measured and associated measurement times, detecting among said real pressure values a maximum real value of the pressure, and comparing said maximum real value of the pressure and the associated measurement time with, respectively, a predetermined maximum reference value of the pressure ($P_{B1}$) and an associated reference time ($t_{B1}$), wherein the command system (34) is programmed for:

verifying if the following necessary conditions are fulfilled together over a period that is greater than or equal to a length of time of a heating cycle and for all of the molding stations (14):

the measurement time associated with the maximum real value of the pressure coincides with the reference time ($t_{B1}$), and the maximum real value of the pressure is less than the maximum reference value of the pressure ($P_{B1}$), where the maximum real value of the pressure is determined to be less than the maximum reference value of the pressure ($P_{B1}$) if the difference between the maximum real value of the pressure and the maximum reference value of the pressure ($P_m$) is greater than several hundred millibars; and in the event that said necessary conditions are fulfilled together, verifying in the chronology of events that no modification of the heating instructions (CC) and no modification of the shaping instructions (CF) has occurred during a predetermined time interval preceding said measuring, wherein the command system is further programmed to determine that the preforms (3) are sub-standard in the event that the verifying indicates that neither of the heating instructions (CC) nor the shaping instructions (CF) has undergone a modification during said predetermined time interval, wherein the installation further comprises an actuator controlled by the command system and structured for carrying out at least one of the following actions:

generating an alert, stopping the supply of the furnace (4) with preforms (3), and ejecting the containers (2) produced from said sub-standard preforms (3).

7. A non-transitory computer-readable recording medium having recorded thereon a computer program executable by a computer processing unit integrated in a command system (34) of a container manufacturing installation (2), where said installation includes a furnace (4) in which the preforms (3) undergo a cyclic heating phase at a heating temperature and a speed of advance according to heating instructions (CC), a system (5) for supplying the furnace (4) with preforms (3), and a shaping unit (6) comprising a number of molding stations (14), each equipped with a mold (15) bearing the imprint of a container (2), for the shaping of containers (2) by blow molding or stretch blow molding of the preforms (3) exiting the furnace (4), said recording medium having recorded thereon heating instructions (CC) and shaping instructions (CF), defining a cyclic shaping phase with a pre-blow-molding step that includes injecting into the preforms (3) a gas at a pre-blow-molding pressure (P) and a pre-blow-molding flow rate according to shaping instructions (CF), followed by a blow-molding step that includes injecting into the preforms (3) a gas at a blow-molding pressure that exceeds the pre-blow-molding pressure, and said computer program being configured to, upon execution by the processing unit of the command system, cause the command system to:

measure, at every instant, a real value of the pressure prevailing in the preforms (3) within each mold (15), at least during the pre-blow-molding step;

store the real pressure values thus measured and associated measurement times;

detect among said real pressure values a maximum real value of the pressure; and compare said maximum real value of the pressure and the associated measurement time with, respectively, a predetermined maximum reference value of the pressure ($P_{B1}$) and an associated reference time ($t_{B1}$), verify if the following necessary conditions are fulfilled together over a period that is greater than or equal to a length of time of a heating cycle and for all of the molding stations (14):

the measurement time associated with the maximum real value of the pressure coincides with the reference time ($t_{B1}$), and the maximum real value of the pressure is less than the maximum reference value of the pressure ($P_{B1}$), where the maximum real value of the pressure is determined to be less than the maximum reference value of the pressure ($P_{B1}$) if the difference between the maximum real value of the pressure and the maximum reference value of the pressure ($P_{B1}$) is greater than several hundred millibars;

in the event that said necessary conditions are fulfilled together, carry out a verification in the chronology of events that no modification of the heating instructions (CC) and no modification of the shaping instructions (CF) has occurred during a predetermined time interval preceding said measuring; and in the event that the verification indicates that neither of the heating instructions (CC) nor the shaping instructions (CF) has undergone a modification during said predetermined time interval, determine that the preforms (3) are sub-standard and cause an actuator controlled by the command system to carry out at least one of the following actions:

generate an alert, stop the supply of the furnace (4) with preforms (3), and eject the containers (2) produced from said sub-standard preforms (3).

8. The process according to claim 2, wherein the generation of an alert includes displaying a message on a graphic interface.

9. The process according to claim 2, wherein with the furnace (4) and the heating unit (6) being directed respectively by dedicated slave control units (37, 38), both attached to a master control unit (35), the verification operations are carried out by the master control unit (35).

10. The process according to claim 3, wherein the generation of an alert includes displaying a message on a graphic interface.

11. The process according to claim 3, wherein with the furnace (4) and the heating unit (6) being directed respectively by dedicated slave control units (37, 38), both attached to a master control unit (35), the verification operations are carried out by the master control unit (35).

\* \* \* \* \*